United States Patent
Matsumoto et al.

[11] Patent Number: 6,146,579
[45] Date of Patent: Nov. 14, 2000

[54] PROCESS FOR PRODUCING THERMOPLASTIC RESIN HOLLOW MOLDED ARTICLE

[75] Inventors: Masahito Matsumoto; Satoru Funakoshi; Shigeyoshi Matsubara, all of Osaka, Japan

[73] Assignee: Sumitomo Chemical Co., Ltd., Osaka, Japan

[21] Appl. No.: 09/084,493

[22] Filed: May 27, 1998

[30] Foreign Application Priority Data

May 27, 1997 [JP] Japan ................................. 9-136979
May 29, 1997 [JP] Japan ................................. 9-140005

[51] Int. Cl.[7] ............................ B29C 49/06; B29D 22/00
[52] U.S. Cl. ........................... 264/513; 264/571; 264/572
[58] Field of Search .................................. 264/572, 513, 264/571

[56] References Cited

U.S. PATENT DOCUMENTS

| 5,090,886 | 2/1992 | Jaroschek . |
| 5,204,051 | 4/1993 | Jaroschek . |
| 5,262,105 | 11/1993 | Komiyama et al. ..................... 264/572 |
| 5,423,667 | 6/1995 | Jaroschek . |
| 5,456,957 | 10/1995 | Jackson et al. ......................... 264/572 |
| 5,607,640 | 3/1997 | Hendry .................................... 264/572 |
| 5,750,068 | 5/1998 | Gouda et al. ........................... 264/572 |
| 5,759,459 | 6/1998 | Eckardt et al. . |
| 5,798,063 | 8/1998 | Bender et al. .......................... 264/572 |

FOREIGN PATENT DOCUMENTS

| 0 761 408 A1 | 3/1997 | European Pat. Off. . |
| 195 15 741 A1 | 11/1996 | Germany . |
| 57-1241 | 6/1982 | Japan . |
| 59-383 | 1/1984 | Japan . |
| 2-95714 | 12/1990 | Japan . |
| 6-54865 | 9/1994 | Japan . |
| 7-37080 | 5/1995 | Japan . |

OTHER PUBLICATIONS

Patent Abstracts of Japan, vol. 17, No. 552 (M–1491), Oct. 5, 1993, JP 05 154862 A (Jun. 22, 1993).
Patent Abstracts of Japan, Mar. 1994, vol. 18, No. 302 (M–1618), Jun. 9, 1994, JP 06–064024 A (Mar., 1994).

Primary Examiner—Jan H. Silbaugh
Assistant Examiner—Suzanne E. McDowell
Attorney, Agent, or Firm—Pillsbury Madison & Sutro

[57] ABSTRACT

A hollow molded article having no sink marks on its surface and having an excellent appearance is produced by filling a mold cavity with a resin being in a molten state and then ejecting at least a part of the resin by sucking through a resin-ejection opening and introducing gas through a gas-introduction opening into the resin inside of which being in a negative pressure. According to this process, the use of a high-pressure gas is not required.

10 Claims, 5 Drawing Sheets

PROCESS FOR PRODUCING THERMOPLASTIC RESIN HOLLOW MOLDED ARTICLE

BACKGROUND OF THE INVENTION

1. Field of the Invention

The present invention relates to a process for producing a hollow molded article made of a thermoplastic resin. A thermoplastic resin is, hereinafter, referred to as a "resin".

2. Description of the Related Art

Heretofore, there are known a variety of methods for producing a resin molded article such us, for example, an injection molding, a compression molding and an injection-compression molding. Also, various applied techniques thereof have been developed. One of them is a method, so-called a gas-injection molding, wherein a high-pressure gas is injected into a resin being in a molten state in a cavity to form a hollow in the resin. Until now, a variety of modified gas-injection molding methods have been proposed.

JP-A-7-137080 discloses a method wherein a molten resin is supplied into a cavity, then a compressed fluid is injected into and ejected from the resin, and subsequently an opening, which doubles as an inlet and an outlet for the compressed fluid, is closed with a small amount of molten resin.

JP-A-2-295714 discloses a method wherein a mold having a cavity and a sub-cavity that is connected with the cavity is provided, next the cavity is filled with a resin, then a compressed fluid is injected into the resin, and subsequently a hollow is formed in the resin while ejecting a part of the resin to the sub-cavity.

JP-A-6-254865 discloses a method wherein a compressed gas is applied to a resin, which was injected into a cavity, to form a void, and the void is grown to form a hollow in the resin.

These methods have a purpose to prevent a thick portion of the molded article from sinking due to local internal shrinkage of the molten resin caused by its solidification. They successfully dispel sinking by providing a hollow in the thick portion. They, however, are required to use the compressed fluid.

JP-A-57-91241 discloses a method wherein a cavity is filled, with a high pressure, with a resin-that contains a foaming agent, at the same time when filling the cavity is completed a screw is retreated to reduce the pressure in the cavity, and then an unsolidified center portion of the resin is moved by a pressure caused by a decomposed gas to form a hollow in the resin.

JP-B-59-383 discloses a method for producing a hollow molded article wherein a synthetic resin is injected into a cavity, subsequently a fluid is injected into the synthetic resin, and then the fluid is ejected from the synthetic resin.

SUMMARY OF THE INVENTION

An object of the present invention is to solve the drawbacks of the prior art and to provide a method for producing a hollow molded article which has an excellent appearance without using a high-pressure gas.

An aspect of the present invention is a process for producing a hollow molded article comprising the steps of:

providing a mold assembly which comprises a mold including the first mold half and the second mold half wherein each mold half has a mold surface which can define a cavity with another mold half's mold surface, at least one mold half has a resin-supply path that opens to its mold surface through a resin-supply opening, at least one mold half has a resin-ejection path that opens to its mold surface through a resin-ejection opening, and at least one mold half has a gas path that opens to its mold surface through a gas-introduction opening;

supplying a resin being in a molten state to between the mold surfaces through the resin-supply opening to fill the cavity with the resin;

cooling the resin to solidify at least a part of its surface and form a solidified surface layer;

ejecting at least a part of a portion of the resin through the resin-ejection opening by sucking wherein the portion of the resin has not been solidified yet;

introducing gas into the resin through the gas-introduction opening; and cooling the resin in the cavity to solidify it.

This and other aspects will become apparent upon reading the following detailed description of the invention.

DETAILED DESCRIPTION OF THE PREFERRED EMBODIMENT

Figure 1B:
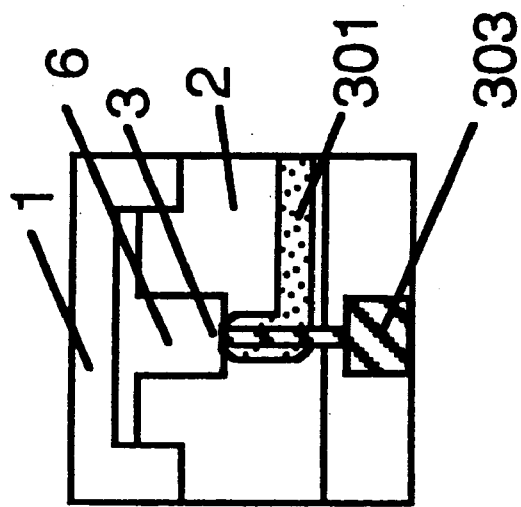
FIGS. 1A and 1B respectively illustrate a front cross section and a side cross section of an exemplary mold assembly which can be used in the present invention.
Figure 1A:
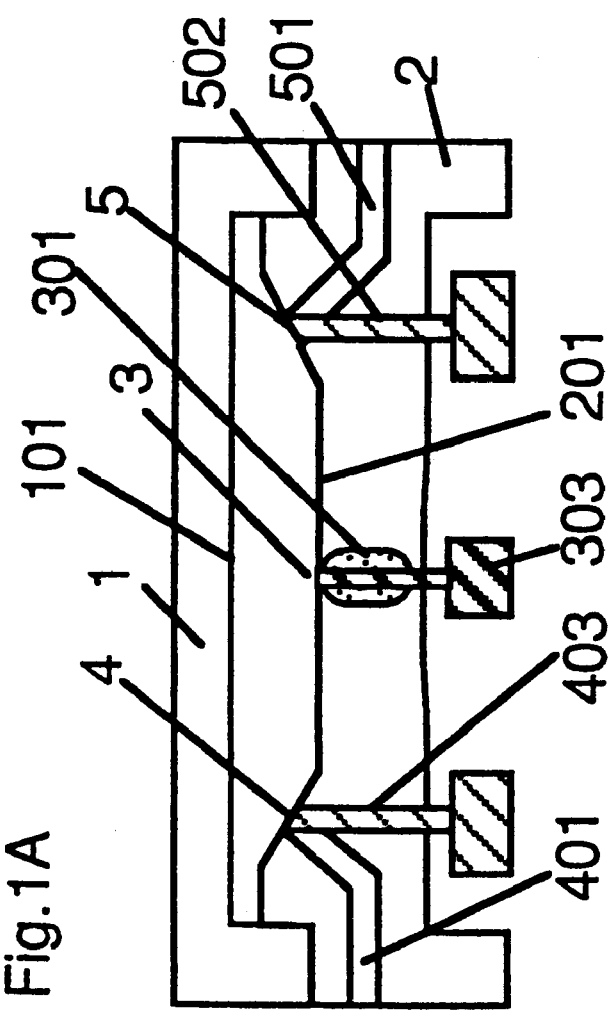
Figure 1C:
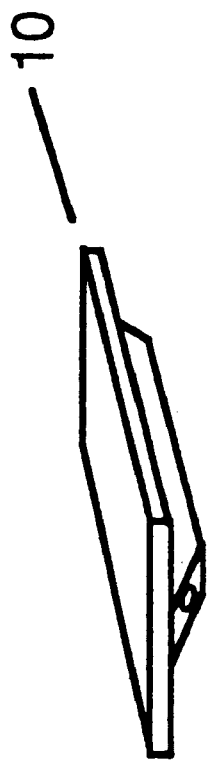
FIG. 1C is a perspective view of an example of a hollow molded article which is obtained by using the mold assembly depicted in FIGS. 1A and 1B.
Figure 2B:
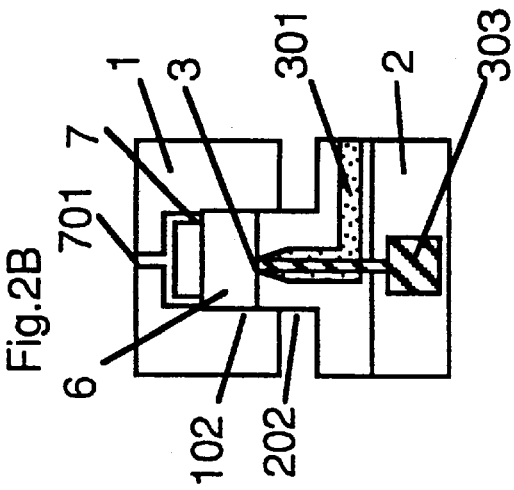
FIGS. 2A and 2B respectively illustrate a front cross section and a side cross section of another example of mold assembly which can be used in the present invention.
Figure 2A:
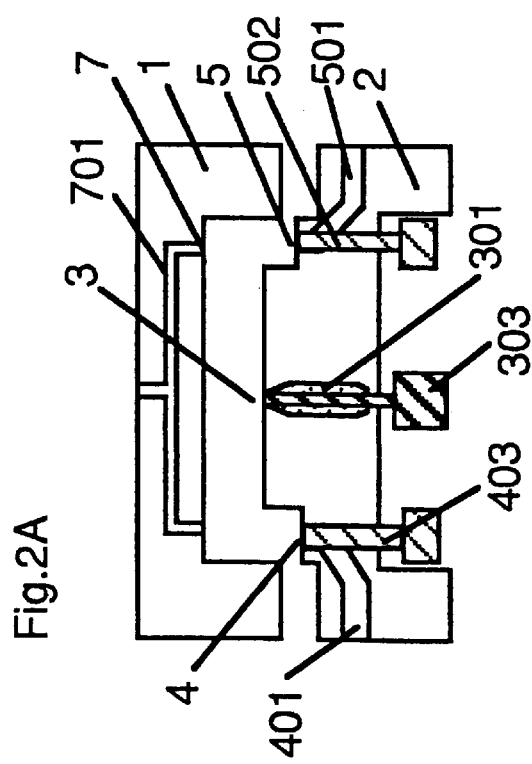
Figure 8:
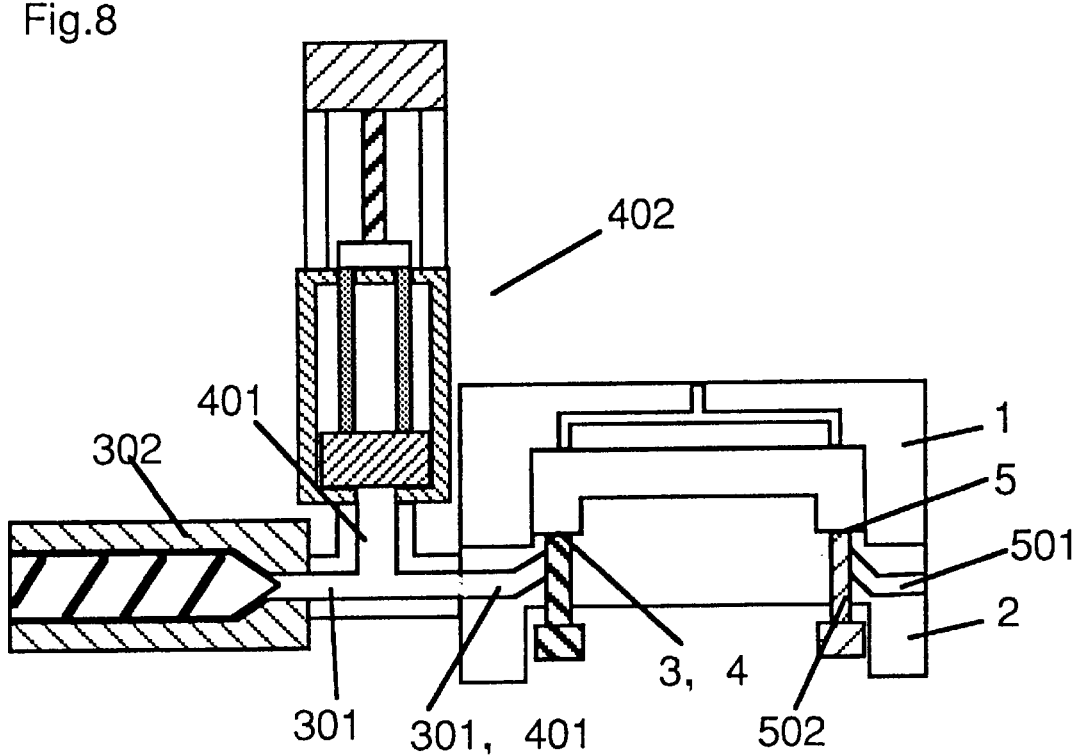
FIG. 8 illustrates a front cross section of another example of the mold assembly which can be used in the present invention.

Examples of a mold assembly which can be used in the present invention are illustrated in FIGS. 1, 2 and 8. The mold assembly comprises a mold including the first mold half (1) and the-second mold half (2). Each mold half has a mold surface (101 or 201) which can define a cavity with another mold half's mold surface. A configuration of each mold surface is designed in accordance with a shape of a molded article to be produced. These mold halves are usually mounted to a clamping machine (not shown), and at least one mold half can move in a direction in which its mold surface moves close or away from another facing mold surface. An absolute direction in which the mold half moves is not particularly restricted, and may be a horizontal direction, a vertical direction or other leaning directions.

At least one mold half has at least one series of resin-supply path (301) that opens to its mold surface through at least one resin-supply opening (3). One terminal of the resin-supply path is joined to a resin-supply machine (302), which is not shown in either FIG. 1 or FIG. 2, such as an injector, an extruder and an accumulator. The resin-supply path may extend outside the mold half. The size, position and number of the resin-supply opening may be determined in accordance with the configuration and size of a cavity (6) and the type and viscosity of the resin to be used or the like so as to supply the resin into the cavity efficiently. The larger the resin-supply opening, the shorter period of time it takes to supply the resin into the cavity. There is suitably employed a resin-supply opening which has the size and shape enough to achieve a period of time similar to that achieved in a general injection molding or injection-compression molding.

A valve (303) for controlling a passing state of the resin may be provided at a desired position in the resin-supply path. The valve is usually provided near the resin-supply opening so as to open and close the opening by its operation. A wall of the resin-supply path is generally controlled at a temperature which is not lower than the melting temperature of the resin to be used and lower than the decomposition temperature of the resin so that the resin is not solidified in the resin-supply path.

At least one mold half has at least one series of resin-ejection path (401) which opens to its-mold surface through at least one resin-ejection opening (4). One terminal of the resin-ejection path is joined to a resin-suction machine (402), which is not shown in either FIG. 1 or FIG. 2, such as a plunger.

Figure 11:
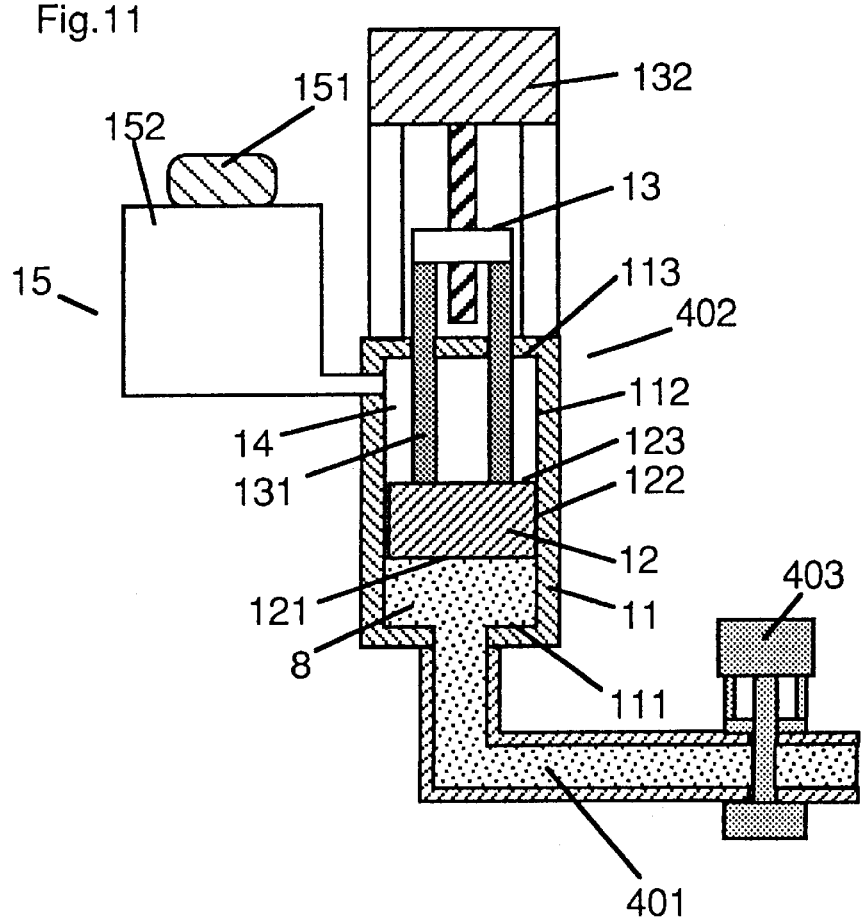
FIG. 11 illustrates a front cross section of an exemplary resin suction machine which is connected to a mold assembly.

Another suitable example of the resin-suction machine (402) is a machine illustrated in FIG. 11 which comprises a cylinder (11); a piston (12) which can move in an axial direction (longitudinal direction) of the cylinder; and a mechanism (13) for holding the piston at a desired position and wherein a space (14) in the cylinder behind the piston is maintained in a substantial vacuum. The cylinder is joined to the terminal of the resin-ejection path. When using this machine, a space which includes the entire resin-ejection path and a region spreading from a front end (111) of the cylinder to a front surface (121) of the piston is always filled with a molten resin in order to prevent impurities such as air, steam, water and the like from coming in. Additionally, a region spreading from the front end of the cylinder to the resin-ejection opening is closely sealed so as to prevent impurities from coming in. The volume of the cylinder is determined depending upon the size of the molded article to be produced, the size of the hollow to be formed in the molded article and the like. The rate of the cylinder's diameter to the length of a piston stroke is selected in the range of from about 0.5 to about 15. The piston is provided in the cylinder so as to slide in cylinder's axial direction (longitudinal direction). A distance between a peripheral surface (122) of the piston and an inner surface (112) of the cylinder is adjusted so as to prevent the resin leaking through a gap between the surfaces. The distance is determined in accordance with the melt viscosity of the resin to be used. The piston is not joined to a mechanical equipment for retreating the piston. The retreat of the piston is effected only by a vacuum-suction force which always acts on a rear surface (123) of the piston. The space (14) behind the piston is generally made a substantial vacuum by suction using a vacuum machine (15) such as a vacuum pump (152) having a vacuum tank (151). This resin-suction machine has the mechanism (13) for holding the piston at a desired position against the vacuum-suction force acting on the rear surface of the piston. A holding mechanism which can mechanically support the piston from its rear surface is preferred because it has a simple structure and can firmly hold the piston. The retreat length of the piston can be controlled by using such holding mechanism. An example of the holding mechanism is a movable rod (131) which penetrates a rear end (113) of the cylinder as illustrated in FIG. 11. The rod may be moved by a driving machine (132) such as, for example, an oil-pressure cylinder, an air-pressure cylinder, a ball screw which is driven by a motor, and the like. By adjusting the projecting length of the rod forward the rear end (113) of the cylinder, the piston can be held at a desired position. The resin which has been sucked into the cylinder is usually ejected from the cylinder prior to the next production cycle. Therefore, the resin-suction machine generally has a mechanism for shoving the piston toward the front end of the cylinder. The aforementioned movable rod (131) can be applied also as the shoving mechanism. When using the resin-suction machine for ejecting the resin from the cavity, the temperature of at least a part of the resin-suction machine, the part being in contact with the resin, should be controlled so as to prevent the resin from cooling to solidify the same.

The size of the resin-ejection opening (4) is determined depending, for example, upon the size and configuration of the cavity and the viscosity of the resin to be used. The larger the resin-ejection opening, the smaller the resistance which acts to the resin during the ejection becomes and the shorter period of time it takes to eject the resin from the cavity. It is preferred that the cross-sectional area of the resin-ejection opening is not less than that of the resin-supply opening.

The position and number of the resin-ejection opening are determined depending, for example, upon the size and configuration of the cavity, the position where a hollow is to be formed in the molded article and the number of the hollow to be formed. The resin-ejection opening should be provided so that a part of the resin that exists at a position where a hollow should be formed can be moved by sucking therethrough. For example, when there is produced a molded article which is significantly large in length comparing to width and has a continuous hollow throughout its length, it is preferred that the resin-ejection opening is provided near an longitudinal end portion of the mold surface as depicted in FIG. 1.

A preferred cross-sectional shape of the resin-ejection path is, but is not particularly limited to, a circle because the resin can easily flow in the resin-ejection path and can be readily controlled its temperature. The larger the cross-sectional size of the resin-ejection path is, the smaller the flowing resistance of the resin which flows in the resin-ejection path becomes and the more easily the resin is ejected, but simultaneously the larger the difference in temperature between a portion of the resin near a wall of the resin-ejection path and a portion of the resin near the center of the resin-ejection path becomes. Therefore, for example, the cross-sectional area of the resin-ejection path having a circular cross section is preferably selected in the range of from about 50 mm² to about 700 mm². It is preferred that the volume of the resin-ejection path is as small as possible. Therefore, it is preferred that the resin-ejection path is as short as possible. Although the resin-ejection path is preferably straight, it may bend or curve. Alternatively, at least a part of the resin-ejection path may be made of a flexible pipe which can freely change in shape.

A valve (403) for controlling a passing state of the resin may be provided at a desired position in the resin-ejection path. The valve is usually provided near the resin-ejection opening so as to open and close the opening by its operation. Conventional valves such as, for example, a slidable pin, a needle valve and a ball valve can be used as the valve. A wall of the resin-ejection path is generally controlled at a temperature which is not lower than the melting temperature of the resin to be used and lower than the decomposition temperature of the resin so that the resin is not solidified in the resin-ejection path.

Figure 9:
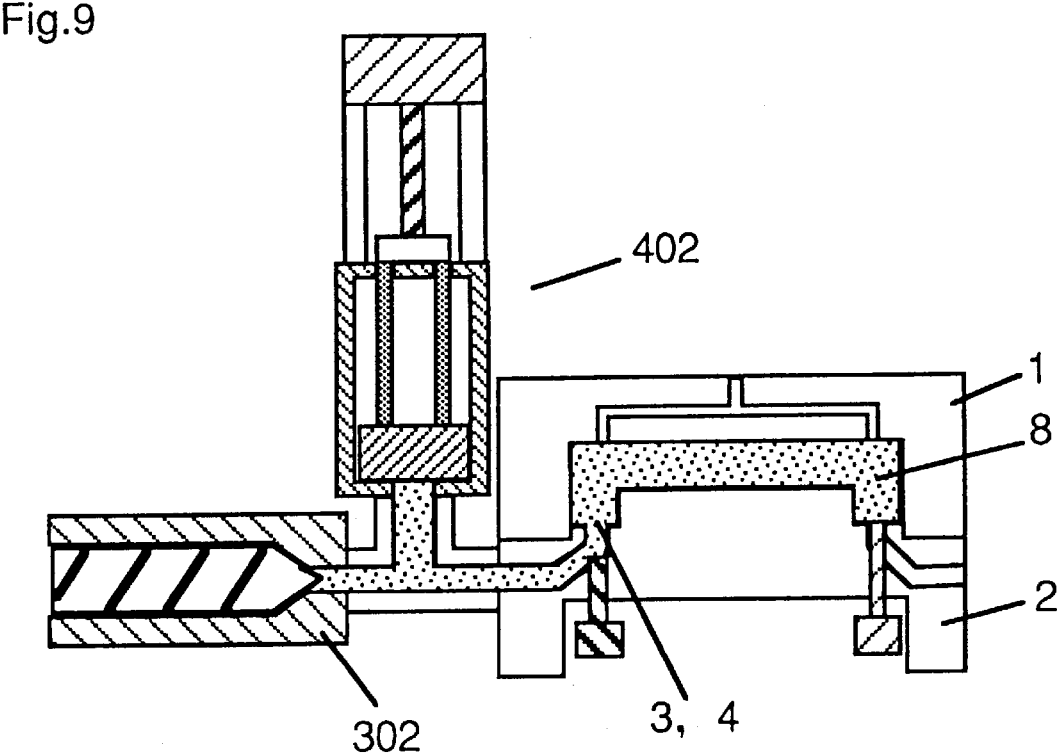
FIG. 9 illustrates a front cross section of an exemplary scene in which the supply of a resin into a cavity defined by mold halves being in a closed state has finished.
Figure 10:
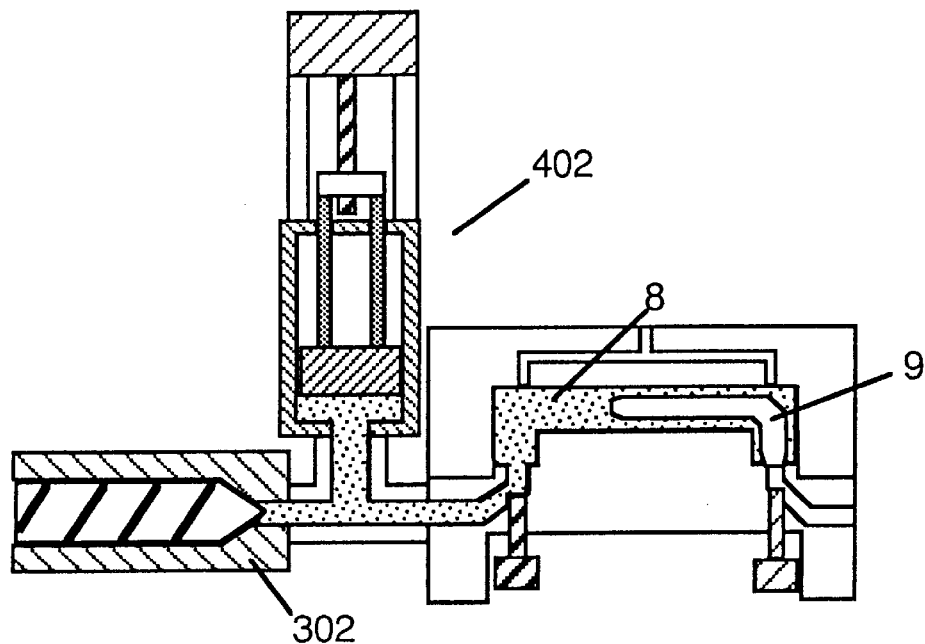
FIG. 10 illustrates a front cross section of an exemplary scene in which a resin is ejected from a cavity and gas is introduced into the resin by the operation of a resin suction machine.

As illustrated in FIG. 8, the resin-supply opening (3) can serve also as the resin-ejection opening (4) and at least a part of the resin-supply path (301) can serve as at least a part of the resin-ejection path (401). A scene in which the mold assembly illustrated in FIG. 8 is employed and the supply of the resin into the cavity defined by the mold halves being in a closed state has finished is depicted in FIG. 9.

At least one mold half has at least one series of gas path (501) which opens to its mold surface through at least one gas-introduction opening (5). One terminal of the gas path is usually led to a space outside the mold half, but it may be joined to a container in which gas is stuffed such as, for example, a gas cylinder. Alternatively, the gas path may be joined to a compressed gas-supply machine such as a compressor so as to assist the ejection of the resin through the resin-ejection opening by blowing gas of a pressure higher than atmospheric pressure into the cavity.

The size of the gas-introduction opening (5) is determined depending, for example, upon the size and configuration of the cavity. A cross-sectional area of the gas-introduction opening may usually be smaller than that of the resin-ejection path. It is because the gas can be readily inhaled without suffering from any substantial resistance as the resin is ejected through the resin-ejection opening, since the flowing resistance of the gas is significantly smaller than that of the resin which is ejected through the resin-ejection opening. If the gas-introduction opening is too large, a large hole would be formed in a surface of the molded article and the appearance of the molded article would be spoiled. On the other hand, if the gas-introduction opening is too small, the flowing resistance of the gas becomes excessively high, and as a result the ejection rate (volume/time) of the resin becomes larger than the introduction rate (volume/time) of the gas. In this case, the ejection of the resin from the cavity makes the pressure inside the resin remaining in the cavity negative, and consequently a solidified surface layer of the resin collapses toward the inside of the resin and the molded article shrivels.

The number of the gas-introduction opening is determined depending, for example, upon the size and configuration of the cavity, and the position where a hollow is to be formed in the molded article and the number, shape and size of the hollow to be formed.

In order to form a hollow in the resin, it is required that a part of the resin existing near the gas-introduction opening (5) can be moved by sucking through the resin-ejection opening (4). Therefore, in general, it is preferred that the gas-introduction opening is provided near the farthest position, away from the resin-ejection opening, in a region in which the resin can be moved by sucking from the resin-ejection opening. The temperature of a wall near the gas-introduction opening is controlled at a temperature higher than that of a mold surface surrounding the gas-introduction opening.

A valve (502) for controlling a passing state of gas may be provided at a desired position in the gas path (501). In general, a valve which can cut off the gas path from the cavity is provided near the gas-introduction opening. Additionally, further valves may be provided at an intermediate position in the gas path. By operating the valve, when the resin is supplied into the cavity the gas-introduction opening is closed and when the resin is ejected from the cavity the gas-introduction opening is opened.

In at least one mold half, at least one series of suction path (701) that opens to the mold surface through at least one suction opening (7) may be provided. This suction path is provided in order to hold the surface of the resin which has been supplied into the cavity by sucking therethrough against the suction force from the resin-ejection opening. One terminal of the suction path is joined to a suction machine (not shown). The size of the suction opening is determined depending, for example, upon the type of the resin to be molded and the suction force from the suction opening so as not to make a suction mark on the surface of the resin. The number of the suction opening is not particularly restricted. Instead of providing a relatively large single suction opening, providing a lot of fine suction openings results in a sufficient suction force and avoidance of the suction mark.

In the process of the present invention, the step of supplying the resin being in a molten state to between the mold surfaces to fill the cavity with the resin can be effected in the following two manners.

The first is a type of injection molding. In this manner, the resin being in a molten state is injected into the cavity through the resin-supply opening with a high injection pressure to fill the cavity with the same, with a condition where the first mold half and the second mold half are held so that the clearance (distance) between their mold surfaces is substantially equal to the thickness of the final molded article. Hereinafter, the state wherein the clearance between the mold surfaces is substantially equal to the thickness of the final molded article is referred to as a "closed state".

Figure 3B:
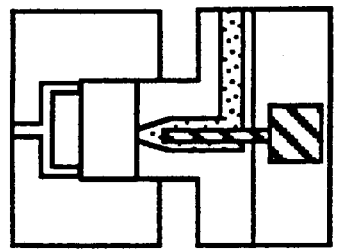
FIGS. 3A and 3B respectively illustrate a front cross section and a side cross section of an exemplary scene in which a resin is supplied to between mold surfaces which are in an unclosed state.
Figure 3A:
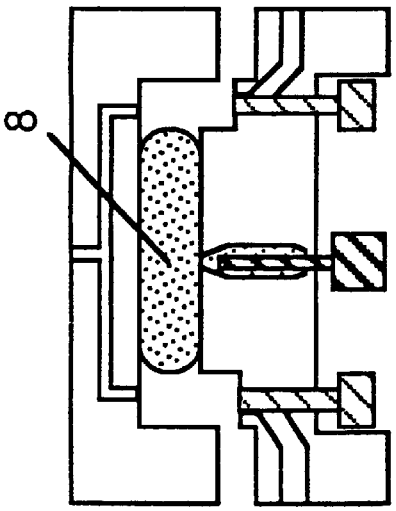
Figure 4:
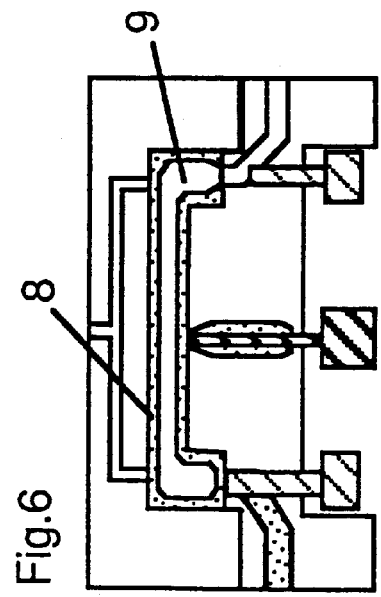
FIG. 4 illustrates a front cross section of an exemplary scene in which a cavity has been filled with a resin.

Another manner is a type of compression molding or injection-compression molding. In this manner, a resin being in a molten state is supplied through the resin-supply opening to between each mold surface of the first mold half and the second mold half which are separated with a clearance larger than the thickness of the final molded article. Before, or at the same time when, or after supplying the resin is completed, at least one mold half is moved close to spread the resin and finally fill the cavity with the resin. Hereinafter, the state wherein the clearance between the mold surfaces is substantially larger than the thickness of the final molded article is referred to as an "unclosed state". An exemplary embodiment of this manner is illustrated in FIGS. 2–4. The first mold half (1) and the second mold half (2) illustrated in FIG. 2 can define together the cavity of a grip-shape between their mold surfaces. In this example, one mold half can move in a vertical direction. In FIG. 2, the first and the second mold halves are separated from each other with a clearance larger than the thickness of the final molded article. There is provided the resin-supply opening (3) that is connected with the resin-supply machine by way of the resin-supply path (301) near the center of the mold surface of one mold half. The resin-ejection opening (4) is provided at one end of the mold surface and the gas-introduction opening (5) is provided at another end of the mold surface. The temperatures of the wall of the resin-supply path (301) near the resin-supply opening (3) and the wall of the resin-ejection path (401) near the resin-ejection opening (4) are individually controlled in order that the resin does not harden to occlude the paths. Valves are provided near the resin-supply opening and near the resin-ejection opening, respectively. The openings can be opened and closed by valve operations. Conventional valves such as, for example, a slidable pin, a needle valve and a ball valve can be employed as the valves. As illustrated in FIG. 3, a resin (8) of a volume substantially equal to that of the final molded article is supplied through the resin-supply opening (3) to between the mold surfaces which are separated with a clearance larger than the thickness of the final molded article. In order to prevent the resin from flooding from between the mold surfaces, it is preferred that an outer peripheral surface (202) of one of the mold halves and an inner peripheral surface (102) of another mold half engage with each other with a slight gap (generally, from about 0.03 mm to about 0.5 mm). At least one mold half is commenced to move close to another mold half before, the same time when, or after supplying the resin is completed in order to spread the resin. And finally the cavity (6) is filled with the resin as illustrated in FIG. 4.

The choice in which manner the step of supplying the resin and filling the cavity is performed depends upon the consideration of the shape and size of the molded article to be produced. The step of supplying and filling is preferably effected in a short period of time (especially, ten seconds or less).

Figure 5:
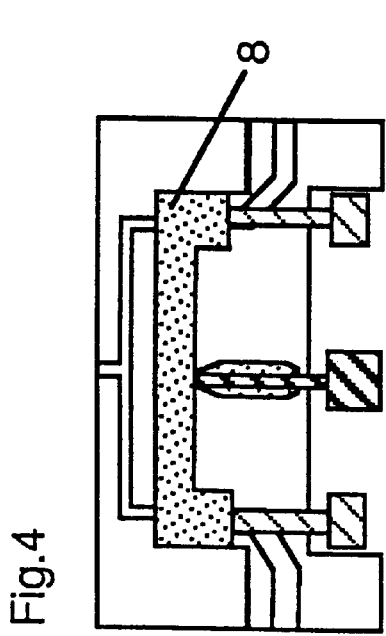
FIG. 5 illustrates a front cross section of an exemplary scene in which gas is introduced into a resin in the cavity.

The temperature of the mold halves is maintained at a temperature at which the mold halves can harden the resin by absorption of heat from the resin through each mold surface. That is, the temperature of the mold halves is maintained at a temperature lower than that of the resin to be supplied. Therefore, the resin (8) which has been supplied through the resin-supply opening (3) is gradually cooled due to escape of heat from the resin to the mold halves, and solidification of the resin proceeds from a part near the mold surfaces to form a solidified surface layer. The solidified surface layer becomes thicker as the time goes. After the solidified surface layer is formed in at least a part of the surface of the resin, the resin-ejection opening (4) is opened to eject at least a part of the resin which has not hardened yet therethrough to the resin-ejection path by sucking as illustrated in FIG. 5. The ejection of the resin is generally conducted with its entire surface being in contact with the mold surfaces. It is not necessary that the solidified surface layer is formed throughout the entire surface of the resin at the beginning of the resin ejection. It will be sufficient if the solidified surface layer has been formed in a region where the suction force from the resin-ejection opening can act on the resin. It is preferred that the resin in the cavity has the solidified surface layer having a thickness enough to prevent deformation caused by suction, and a desirable thickness varies depending upon the type of the resin used, the configuration and size of the cavity and the like. In general, it will be sufficient if the solidified surface layer with a thickness of 0.2 mm or more has been formed. Furthermore, even if the resin-ejection opening has been covered with the solidified surface layer of the resin, the resin ejection can be commenced if the solidified surface layer can be broken by sucking through the resin-ejection opening. The thickness of the solidified surface layer which can be broken varies depending upon the type of the resin used and the strength of suction force. The strength of the suction force through the resin-ejection opening is chosen in accordance with the type and temperature of the resin used, the size of a hollow to be formed, and the like.

Generation of a sink mark and/or crack caused by sucking for resin ejection can be avoided by increasing the thickness of the solidified surface layer. It can be also avoided by sucking the solidified surface layer through the suction opening (7) for holding the solidified surface layer onto the mold surface. This suction may be commenced at any point in time after the completion of filling the cavity with the resin. For example, the suction can be commenced immediately after the completion of filling the cavity with the resin. Sucking through the suction opening may be continued while cooling the resin after the finish of hollow formation. Generation of a sink mark on the surface of the molded article can be effectively avoided by the continuation of suction.

A molten portion inside the resin existing in the cavity moves toward the resin-ejection opening due to sucking therethrough and a part of the molten portion moved is ejected into the resin-ejection path through the resin-ejection opening. The resin which was ejected into the resin-ejection path is led toward the resin-suction machine (402).

When the gas-introduction opening is opened substantially at the same time when or after the ejection of the resin through the resin-ejection opening has begun, the gas is smoothly introduced through the gas-introduction opening into the resin, the inside of which is in a negative pressure due to the ejection of the resin. Theoretically, the introduction of the gas can be commenced after the completion of the resin ejection, but at least a part of the step of introducing the gas is generally effected with at least a part of the step of ejecting the resin. When the ejection of the resin is effected with the introduction of the gas, the introduction of the gas proceeds as the inner molten portion of the resin retreats toward the resin-ejection opening due to ejecting the resin. Consequently a hollow (9) is formed in the resin. Because the formation of the solidified surface layer proceeds during the ejection of the resin and the introduction of the gas, some difference in thickness of a resin wall between at a part near the gas-introduction opening and at a part far from the same will arise or a sufficiently long hollow will not be formed if it takes too much time to eject the resin. When the ejection of the resin can not be effected smoothly because of an insufficient suction force for ejecting the resin, the ejection of the resin can be assisted by supplying gas of a pressure higher than atmospheric pressure through the gas-introduction opening. The pressure of the gas of about 1 MPa may be enough for this purpose.

Figure 6:
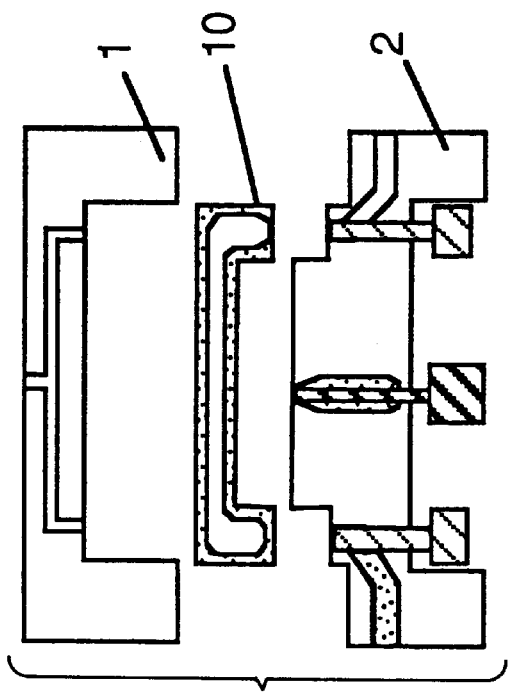
FIG. 6 illustrates a front cross section of an exemplary scene in which a hollow molded article is cooled in a cavity after the formation of a hollow.
Figure 7:
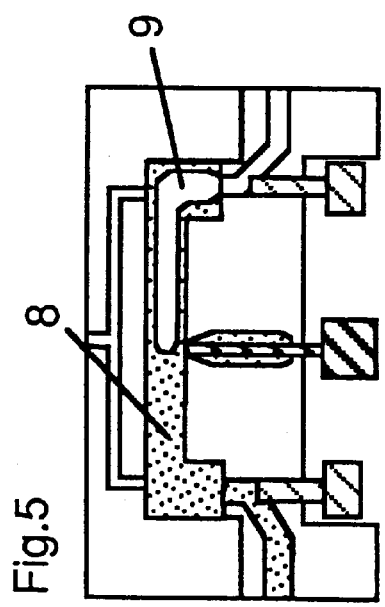
FIG. 7 illustrates a front cross section of an exemplary scene in which the mold halves are opened so that the hollow molded article is taken out.

After the completion of the resin ejection, the gas introduction and the hollow formation, the resin-ejection opening is closed and the resin is cooled in the cavity as shown in FIG. 6. Immediately after the completion of the hollow formation, the resin near the hollow is generally much hotter than that near the mold surfaces. Therefore, the resin near the hollow much shrinks due to cooling than that near the mold surfaces, and as a result, the outer surface of the molded article would sink. It is effective in avoiding the sink mark to open the gas-introduction opening as shown in FIG. 6 to release a hot gas which was shut in the hollow therethrough and at the same time introduce a cool gas into the hollow from the outside of the mold assembly. Doing this, it is possible to make a good balance in shrinkage between the resin near the outer surface of the molded article and that near the hollow. It is also possible to prevent the outer surface of the molded article from sinking. In general, after cooling the hollow molded article in the cavity in order that it does not deform when it is taken out from the cavity, at least one mold half is moved to open the mold and subsequently the hollow molded article (10) is taken out as depicted in FIG. 7.

In the process of the present invention, employing a mold assembly including a mold which has a thick part-forming portion for forming a part (namely, a thick part) of the hollow molded article which is thicker than its surrounding part and wherein a resin-ejection opening is provided at a position where at least a part of the resin supplied in the thick part-forming portion can be moved by sucking from the resin-ejection opening and wherein a gas-introduction opening is provided near the thick part-forming portion, a hollow molded article which has a hollow in the thick part can be produced.

The resin which was ejected to the resin-suction machine (402) or the resin-ejection path (401) can be recycled to the resin-supply machine (302) for reuse. As illustrated in FIG. 8, using an assembly wherein a path leading to an opening provided in a mold surface is divided into two branched paths, one of them being joined to the resin-supply machine and another being joined to the resin-suction machine, the resin can be supplied and subsequently ejected through the same opening.

In the process of the present invention, there can be employed thermoplastic resins which can be used for conventional molding methods such as an extrusion molding, an injection molding, a press molding, an injection-compression molding and the like. A suitable thermoplastic resin may be, but is not limited to, polyethylene, polypropylene, acrylonitrile-styrene-butadiene copolymer, polyvinyl chloride, polyamide, polycarbonate, polyethylene terephthalate, mixtures thereof, polymer alloys made of these polymers. Among them, resins of relatively low melt viscosity can be appropriately employed. Resins having a melt flow rate (MFR) of about 5 g/10 minutes or more, particularly from about 5 g/10 minutes to about 200 g/10 minutes at a temperature for molding them, can be preferably employed. Resins having MFR less than about 5 g/10 minutes results in a relatively large flow resistance of the resin being in a molten state and a relatively long time for ejecting the resin. Also, there can be employed compositions comprising the thermoplastic resin and a variety of additives such as reinforcing fibers and fillers. Although the temperature of the resin which may be supplied through the resin-supply opening varies depending upon the type of the resin, it may be a general molding temperature of the resin. For example, a suitable molding temperature for polypropylene is from about 200° C. to about 250° C. Although a suitable temperature of the mold surface of the mold half varies depending upon the type of the resin to be molded, it is, for instance, from about 20° C. to about 80° C. for polypropylene.

Suitable gas to be introduced through the gas-introduction opening is gas which is inert to the resin such as air, nitrogen, helium, and the like. Air and nitrogen are useful, and economical (i.e. inexpensive).

In the process of the present invention, by supplying a skin material such as a resin sheet, a woven fabric, a non-woven fabric and the like to between the mold halves prior to the step of supplying the resin, a hollow molded article wherein at least a part of its surface is covered with the skin material can be produced. Also, by supplying a molded part made of metal, ceramics, glass, resin or the like instead of the above skin material, a hollow molded article wherein the molded part is incorporated therein can be produced.

In accordance with the present invention, a hollow molded article can be readily obtained without using any high-pressure gas as an essential means.

While the present invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. Complete disclosure of Application Nos. 09-136979 and 09-140005, which were filed in Japan on May 27, 1997 and May 29, 1997, respectively, is incorporated herein by reference.

What is claimed is:

1. A process for producing a hollow molded article of thermoplastic resin comprising:
    (a) providing a mold assembly comprising a mold including a first mold half and a second mold half wherein each mold half has a mold surface which can define a cavity with a mold surface of another mold half, at least one mold half has a resin-supply path which opens to the mold surface through a resin-supply opening, at least one mold half has a resin-ejection path which opens to its mold surface through a resin-ejection opening, at least one mold half has a gas path which opens to its mold surface through a gas-introduction opening and, at least one mold half has at least one suction opening that opens to its mold surface through a respective at least one suction path;
    (b) supplying a resin being in a molten state to between the mold surfaces through the resin-supply opening to fill the cavity with the resin;
    (c) cooling the resin to solidify at least a part of its surface and form a solidified surface layer;
    (d) holding on and contacting to the mold surface at least a part of the surface of the solidified layer by suction through said at least one mold half in which said at least one suction path is provided;
    (e) during the holding on and contacting, ejecting at least a part of a portion of the resin through the resin-ejection opening by sucking wherein the portion of the resin has not solidified yet;
    (f) introducing gas into the resin through the gas-introduction opening to form a hollow in the resin such that gas provided to form the hollow in the resin is not discharged with the resin being ejected through the resin-ejection path; and
    (g) cooling the resin in the cavity to solidify it and form the hollow molded article.

2. The process according to claim 1, wherein the pressure of the gas to be introduced through the gas-introduction opening is higher than atmospheric pressure.

3. The process according to claim 1, wherein in the step (b) the resin is supplied into the cavity being in a closed state to fill it.

4. The process according to claim 1, wherein in the step (b) the resin is supplied to between the mold surfaces of the mold halves being in an unclosed state, and before or at the same time when or after supplying the resin has completed at least one mold half is moved close to another mold half to spread the resin, and finally the cavity is filled with the resin.

5. The process according to claim 1, wherein the resin-supply opening serves also as the resin-ejection opening and at least a part of the resin-supply path serves also as the resin-ejection path.

6. The process according to claim 1, wherein the mold halves can form a cavity having a thick-part forming portion, and in the step (f) the gas is introduced through a gas-introduction opening provided near the thick-part forming portion to form a hollow in the thick-part forming portion.

7. The process according to claim 1, wherein at least a part of the step (e) and at least a part of the step (f) are effected at the same time.

8. The process according to claim 1, wherein in the step (e) sucking is effected by using a machine comprising a cylinder, a piston which can move in an axial direction of the cylinder and a mechanism for holding the piston at a desired position wherein a space in the cylinder behind the piston is maintained in a vacuum to effect the retreat of the piston to a desired position.

9. The process according to claim 1, wherein a step of supplying a skin material to between the mold halves is performed prior to the step (b).

10. The process according to claim 1, wherein a step of supplying a molded part to between the mold halves is performed prior to the step (b).

* * * * *